US007014148B2

(12) United States Patent
Dominguez

(10) Patent No.: US 7,014,148 B2
(45) Date of Patent: Mar. 21, 2006

(54) COCKPIT SECURITY DOOR/RESTROOM

(75) Inventor: Armando Dominguez, Federal Satellite Low 2650 Hyw. 301 S., Jesup, GA (US) 31599

(73) Assignee: Armando Dominguez, Miami, FL (US)

( * ) Notice: Subject to any disclaimer, the term of this patent is extended or adjusted under 35 U.S.C. 154(b) by 0 days.

(21) Appl. No.: 10/969,612

(22) Filed: Oct. 21, 2004

(65) Prior Publication Data

US 2005/0230550 A1    Oct. 20, 2005

Related U.S. Application Data

(60) Provisional application No. 60/512,983, filed on Oct. 21, 2003.

(51) Int. Cl.
*B64D 11/02* (2006.01)
(52) U.S. Cl. .............................................. 244/118.5 R
(58) Field of Classification Search ............. 244/118.5, 244/129.4, 129.5
See application file for complete search history.

(56) References Cited

U.S. PATENT DOCUMENTS

| 5,150,863 | A | * | 9/1992 | Hozumi | 244/118.5 |
| 6,012,678 | A | * | 1/2000 | Hale et al. | 244/118.5 |
| 6,702,231 | B1 | * | 3/2004 | Ward | 244/118.5 |
| 6,745,982 | B1 | * | 6/2004 | Lehmann | 244/118.5 |
| 6,844,817 | B1 | * | 1/2005 | Gleine | 340/574 |
| 6,880,785 | B1 | * | 4/2005 | Barbara et al. | 244/118.5 |
| 6,938,284 | B1 | * | 9/2005 | Kitade et al. | 4/664 |

* cited by examiner

*Primary Examiner*—Tien Dinh

(57) ABSTRACT

A device for converting a regular cockpit door and its surrounding traffic area for a cockpit security door/restroom 10, to prevent intrusion into the cockpit 53 during a route, having a bulletproof case 12 installed on a hardened wall 17 isolating the cockpit 53 from the cabin 52. The case 12 basically contains in its interior: a toilet 24, a sink 91, various panoramic-one-way lenses 42 to observe the cabin 52, a security service window 30 to receive meals, drinks, etcetera from the cabin 52; it also is provided with an ambient air purifier unit 81 and a bifold door 11 or curtain to provide privacy from other crewmembers while utilizing the facilities. The case performs as a door at beginning or end of a route, as a restroom during the route, and takes almost no needed space from the aircraft 13 or other means of transportation, while functioning to provide security and comfort to cockpit crewmembers.

8 Claims, 9 Drawing Sheets

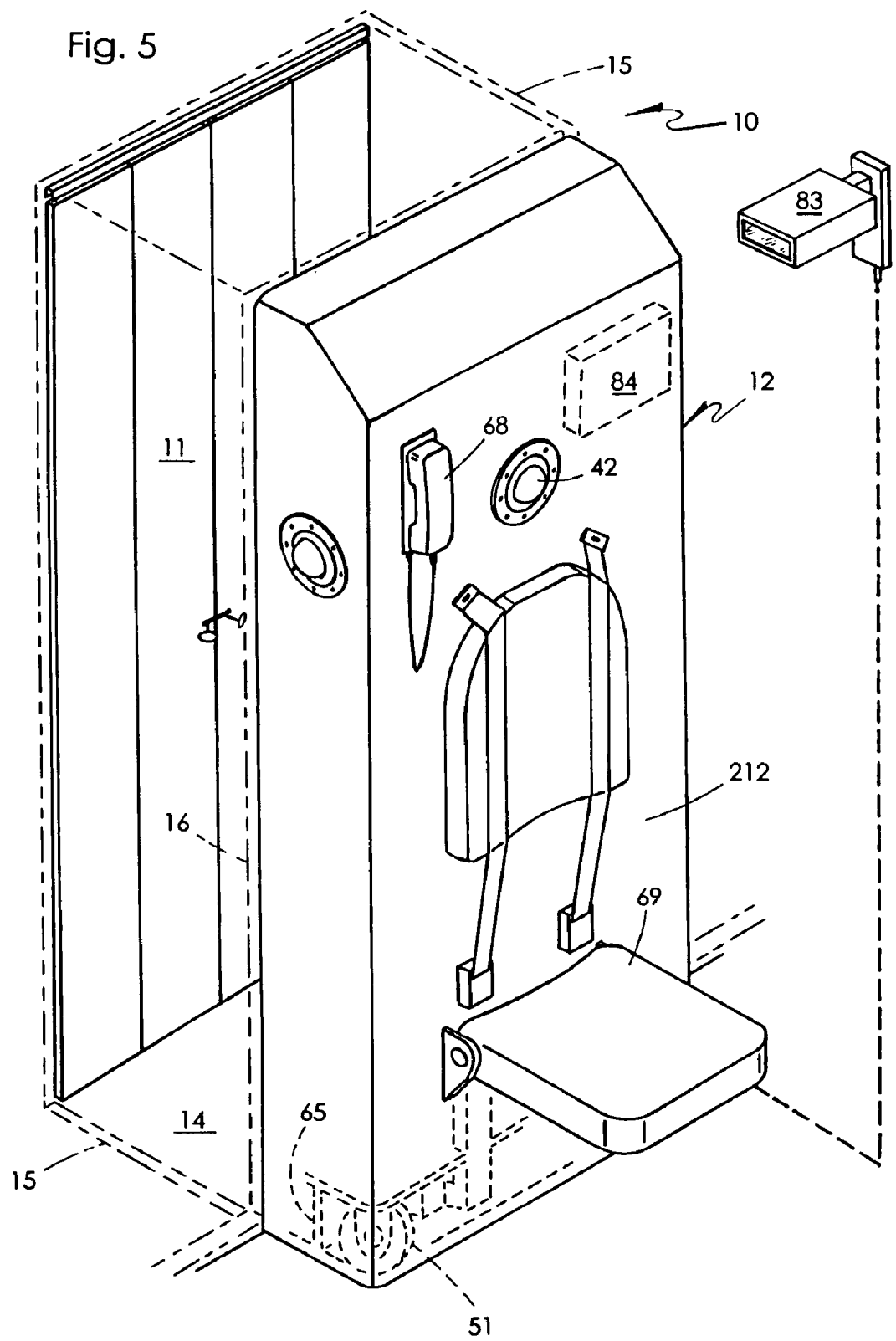

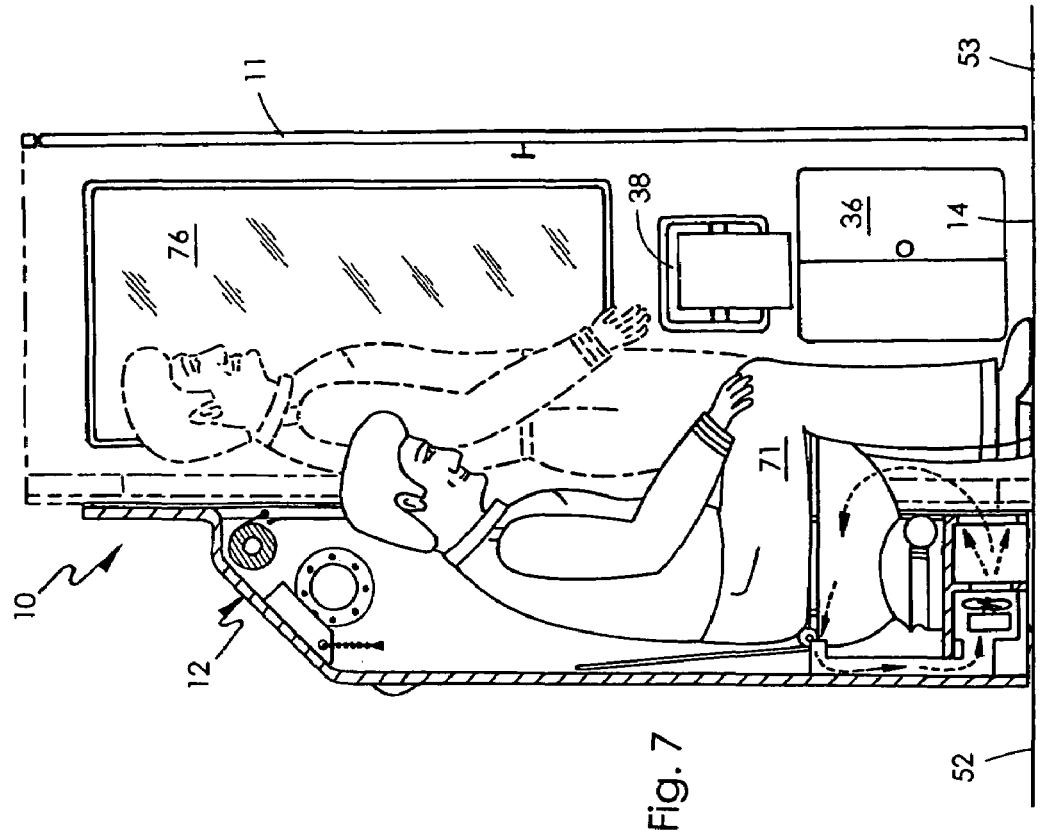
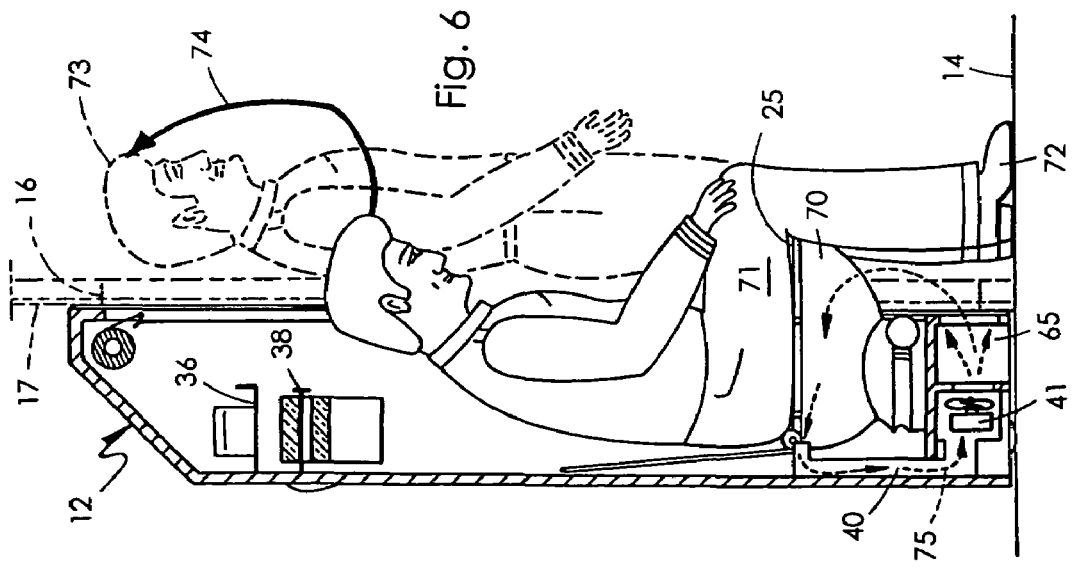

COCKPIT SECURITY DOOR/RESTROOM

CROSS-REFERENCE TO RELATED APPLICATIONS:

This application claims the benefit of provisional patent application Ser. No. 60/512,983 filed 2003 Oct. 21 by the present inventor.

BACKGROUND OF THE INVENTION—FIELD OF THE INVENTION

The present invention relates to sanitary facilities to improve the security and comfort of the cockpit in means of transportation, especially for eliminating the hijacking risks of commercial aircraft.

BACKGROUND OF THE INVENTION—PRIOR ART

The best mode, in which I presently prefer to disclose the present invention, illustrates its embodiments performance in an aircraft, but that is not the only transport means in which the present invention can provide a substantial increase in security as well as crew comfort. Several methods of securing a commercial flight from terrorist attacks have been proposed by the Air Transportation Authorities, which include: a bulletproof door, a hardened wall isolating the cockpit from the cabin, armed pilots, and armed marshals flying as putative passengers. However, the effectiveness of these methods is doubtful and none of them are able to effectively secure the cockpit from intrusion when a cockpit crewmember requires physiological relief; e.g. to urinate/defecate.

At present, this type of necessity would require that the cockpit crewmember open the cockpit door to enter the cabin area where the restrooms are located, thereby allowing a possible intrusion into the cockpit. Of course, this opens an excellent opportunity for a hijacker to gain possession of the cockpit controls, make hostages of cockpit crewmembers, and risks the horrors of another potential 9/11 disasters.

In presenting this invention, intrusion into the cockpit by unknown unauthorized persons, due to the normal physical needs of the cockpit crewmembers, is made practically impossible.

My invention is a cockpit security door/restroom that is basically composed of a bulletproof container which performs as a door at the beginning or end of a route, and as a restroom facility for cockpit crewmembers during the route, basically comprising a toilet and sink with a fresh water supply, a panoramic viewer to observe the cabin area, and a secure service slot to receive meals, drinks or other service. It also includes a means to provide clean ambient air and privacy from other cockpit crewmembers while utilizing the facilities.

With the implementation of my invention, there is no requirement to open the cockpit door to the cabin and its population. Any attempts to enter said cabin are frustrated by the Cockpit Security Door/Restroom.

This necessary, advantageous, advanced device is suitable and presently adaptable to most current commercial aircraft and can be easily adapted for future aircraft models and transportation means other than aircraft, which include a cabin for the public or cargo adjacent and accessible to the cockpit.

BACKGROUND OF THE INVENTION—OBJECTS AND ADVANTAGES

Accordingly, beside the objects and advantages of the Cockpit Security Door/Restroom described in my above patent, several objects and advantages of the present invention are evident.

It is one of the objects of the present invention to increase the security and pilot's comfort in the air transport without sacrificing needed space in the aircraft.

It is another object of this invention to provide commercial airlines with an adaptable sanitary facility in most existing aircraft models, as well as having the ability to be adapted for future models.

It is another object of this invention to provide the personnel in control of a transportation means's command equipment with a secure and comfortable door/restroom.

Further objects of the invention will be brought out in the following part of the specification, wherein detailed description is provided for the purpose of fully disclosing the invention without placing limitations thereon.

SUMMARY OF THE INVENTION

In accordance with the present invention, a device to prevent intrusion into the cockpit of a means of transport, having a hardened wall isolating the cockpit from the cabin, a privacy door or curtain to interrupt the vision to a closed cockpit area surrounding a bulletproof case, which basically includes in its concave section: a toilet, a sink, a lock mechanism to provide or interrupt the access from the cabin, a device to recycle and filter ambient air, a slot with panoramic one-way lenses to observe the cabin from the concave section, and a service window from which to receive food, drink, or other articles from the cabin.

Said device is designed to convert a cockpit or a regular cockpit door to a cockpit security door/restroom, which provides closer access to sanitary facilities and can be utilized by cockpit personnel while a route is completed, while also insuring privacy when utilizing said restroom. The case also is able to perform as a security door, preferably at the beginning or end of the route.

In the description section of this patent application and its corresponding drawings, I presently prefer to illustrate all embodiments of the present invention as installed in an aircraft's cockpit. After that, a reader having an ordinary skill in this field will fully understand the construction of the embodiments and its functions in the aircraft's cockpit; it will be evident that he/she would be able to visualize the embodiments installed to protect and service other transport means in a similar mode, without the need to provide an additional description with a set of drawings explaining separately the installation and functions in each means of mass transport of people, cargo, etc.

BRIEF DESCRIPTION OF THE DRAWINGS

With the above and other related objects in view, the invention, consisting of the details of construction and combination of parts, will be more fully understood from the following description when read in conjunction with the accompanying drawing in which:

FIG. 5 shows a rear perspective view of an additional embodiment; the dash-dot-dot-dash lines represented parts that exist in the aircraft; the dashed lines represent hidden parts.

FIG. 6 represents a cutting section taken from the right elevation of the preferred embodiment, in which is not showing all the parts of the case body; two different types of lines have been applied to indicate two different positions for a person, solid for a seated position and broken for a standing position. A heavy line is used to indicate the trajectory of a head, and dashed lines are used to indicate the air path.

FIG. 7 illustrates a cutting section of an alternative embodiment; also have the proposed to be compared with FIG. 6 indicate different locations and sizes of some parts.

DRAWINGS--Reference numerals

Figure 1F:
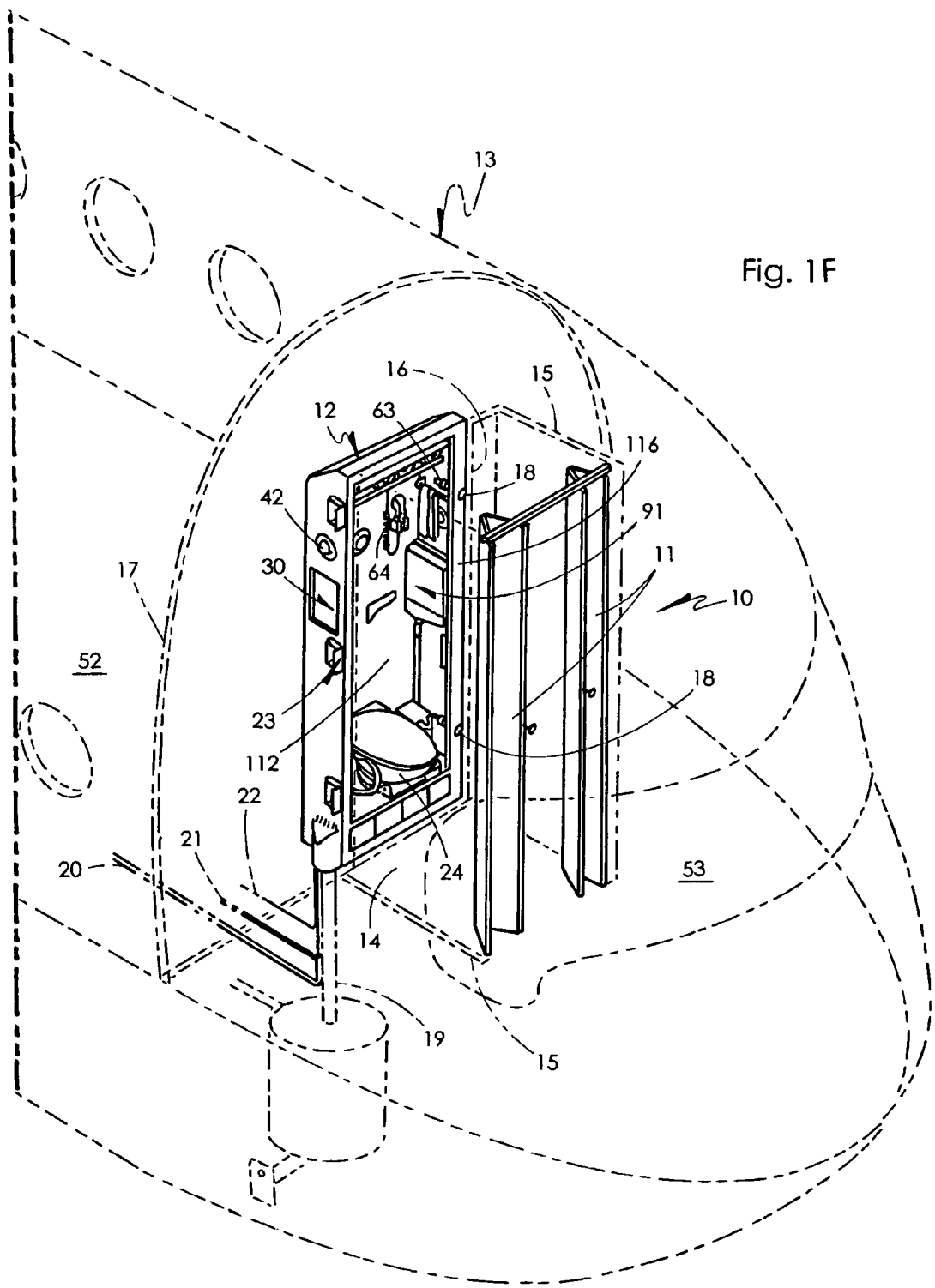
FIG. 1F illustrates a front perspective view of the preferred embodiment installed in an aircraft, which does not show command equipment, military, passenger, or cargo facilities; the entry wall paneling of cabin and doorframe are shown in thin dash-dot-dot-dash lines to indicate their existence in the aircraft.

| | | | |
|---|---|---|---|
| 10 | preferred embodiment | 11 | privacy door |
| 12 | bulletproof case | 13 | aircraft |
| 14 | restroom space | 15 | cockpit entry panel walls |
| 16 | doorframe | 17 | wall to isolate cockpit |
| 18 | stat. lock member's case | 19 | main drain line |
| 20 | flexible water line | 21 | flexible electrical line |
| 22 | flexible electronic line | 23 | hinges |
| 24 | toilet assembly | 25 | toilet seat |
| 26 | toilet cover | 27 | hinged sink recipient |
| 28 | recipient groove | 29 | sink handle |
| 30 | service window | 31 | manual locking device |
| 32 | window stat. lock pin | 33 | hinged bracket |
| 34 | tray with meals | 35 | flight attendant |
| 36 | supply shelf | 37 | supply articles |
| 38 | toilet paper holder | 39 | air return conduit |
| 40 | air duct | 41 | air blower |
| 42 | panoramic one-way lenses | 43 | water control box |
| 44 | flush mechanism | 45 | flush line |
| 46 | worm-gear input shaft | 47 | pivoting toilet coupling |
| 48 | pivoting drain line coupling | 49 | stage |
| 50 | slot on floor | 51 | rolling mechanism |
| 52 | cabin | 53 | cockpit |
| 54 | handy shower | 55 | case door protuberance |
| 56 | worm-gear drive mechanism | 57 | worm pinion driver roll |
| 58 | hollow gear | 59 | garbage can cover |

DRAWINGS--Reference numerals -continued

| | | | |
|---|---|---|---|
| 60 | disposable plastic liner | 61 | trashcan |
| 62 | case door handle | 63 | lock member's case |
| 64 | cockpit intercom handset | 65 | air exhaust duct |
| 66 | air ambient filter | 67 | retractable cover |
| 68 | cabin handset intercom | 69 | attendant seat |
| 70 | toilet front section | 71 | pilot (crewmember) |
| 72 | pilot's feet | 73 | pilot's head |
| 74 | trajectory | 75 | air path |
| 76 | mirror | 77 | lamp fixture |
| 78 | faucet | 79 | sink drain pipe |
| 80 | "Y" drain coupling | 81 | air purifier unit |
| 82 | center lines | 83 | electronic camera |
| 84 | electronic image display | 85 | rigid toilet coupling |
| 86 | multiple-conduit-holder | 87 | rigid toilet base |
| 88 | air conditioner | 89 | movable hinge leaf (case) |
| 90 | leaf hinge (doorframe) | 91 | sink unit |
| 92 | stationary sink recipient | 93 | soap dish |
| 94 | towel bar | 112 | case, concave section |
| 113 | lower cavity section | 116 | flat edge case |
| 152 | cabin floor | 212 | case, convex section |

DETAILED DESCRIPTION

FIGS. 1F, 1R, 2, 3, 4, and 6 Preferred embodiment.

A preferred embodiment of the Cockpit Security Door/Restroom of the present invention, illustrated in FIG. 1F (perspective view), is generally referred to as number 10. The Cockpit Security Door/Restroom 10, comprising a bulletproof wall 17, which I presently prefer to illustrate in the FIGS. 1F and 6, as existing in an aircraft 13; this wall 17 includes a doorframe 16, various stationary leaf hinges 90 (FIGS. 1F and 3), also fixed perpendicular and parallel to said doorframe 16, two stationary lock members 18, set on said doorframe 16, opposite from the leaf hinges' edge.

A rectangular bulletproof case 12, having a flat edge case 116 substantially sized to cover the contour of the doorframe 16, a stage 49 fixed to the low concave section of the case 12, creating a top concave section 112 and a lower cavity section 113, both sections facing to a cockpit 53, and a protruding cavity 55 that is presently illustrated on the left side of the case 12. The material utilized in the construction of the case 12 is opaque and strong enough to support aircraft equipment installed on its case convex section 212, this equipment can be a seat 69 to accommodate a flight attendant as illustrates the FIG. 5 (which illustrates an additional embodiment). Various movable leaf hinges 89 are fixed vertically on the same case wall as the protruding cavity 55. The movable leaf hinges 89 couple, by means of pin hinges, to the stationary hinges 90.

Figure 2:
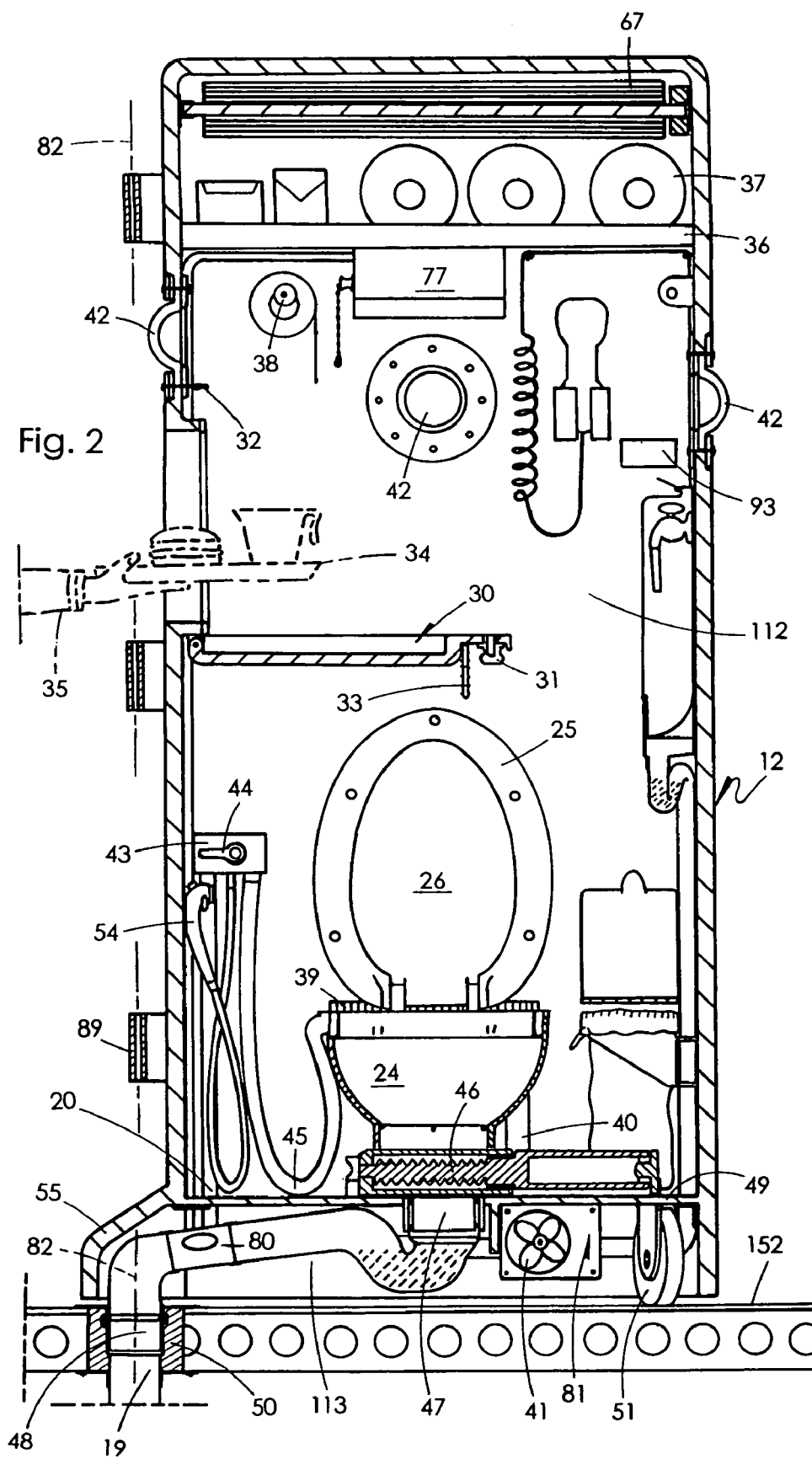
FIG. 2 shows a front elevation view of the preferred embodiment's case, in which illustrated multiple sectional views coming from FIG. 1. Thin dash-dot-dot-dash lines represent the objects that are not parts of the invention; dash-dot-dash lines represent the centerlines.

A rolling mechanism 51 is set under the stage 49, inside of the lower cavity section 113 (FIGS. 2 and 5), opposite from the protruding cavity 55, enabling it to help share part of the load of the case assembly with the hinges 23; the rolling mechanism moves over the cabin floor 152 (FIG. 2). A handle 62 is vertically fixed on the flat edge 116, inside the concave section 112 opposite the hinge's edge; two lock member's case 63 are rigidly mounted on said flat edge 116 of the door, close to the handle 62; two stationary lock members 18 are mounted on the doorframe; both stationary lock members and door-mounted lock mechanisms are designed to fit and lock together when said case's flat edge surface 116 is in full contact with the doorframe's contour 16 (FIG. 1F).

Figure 3:
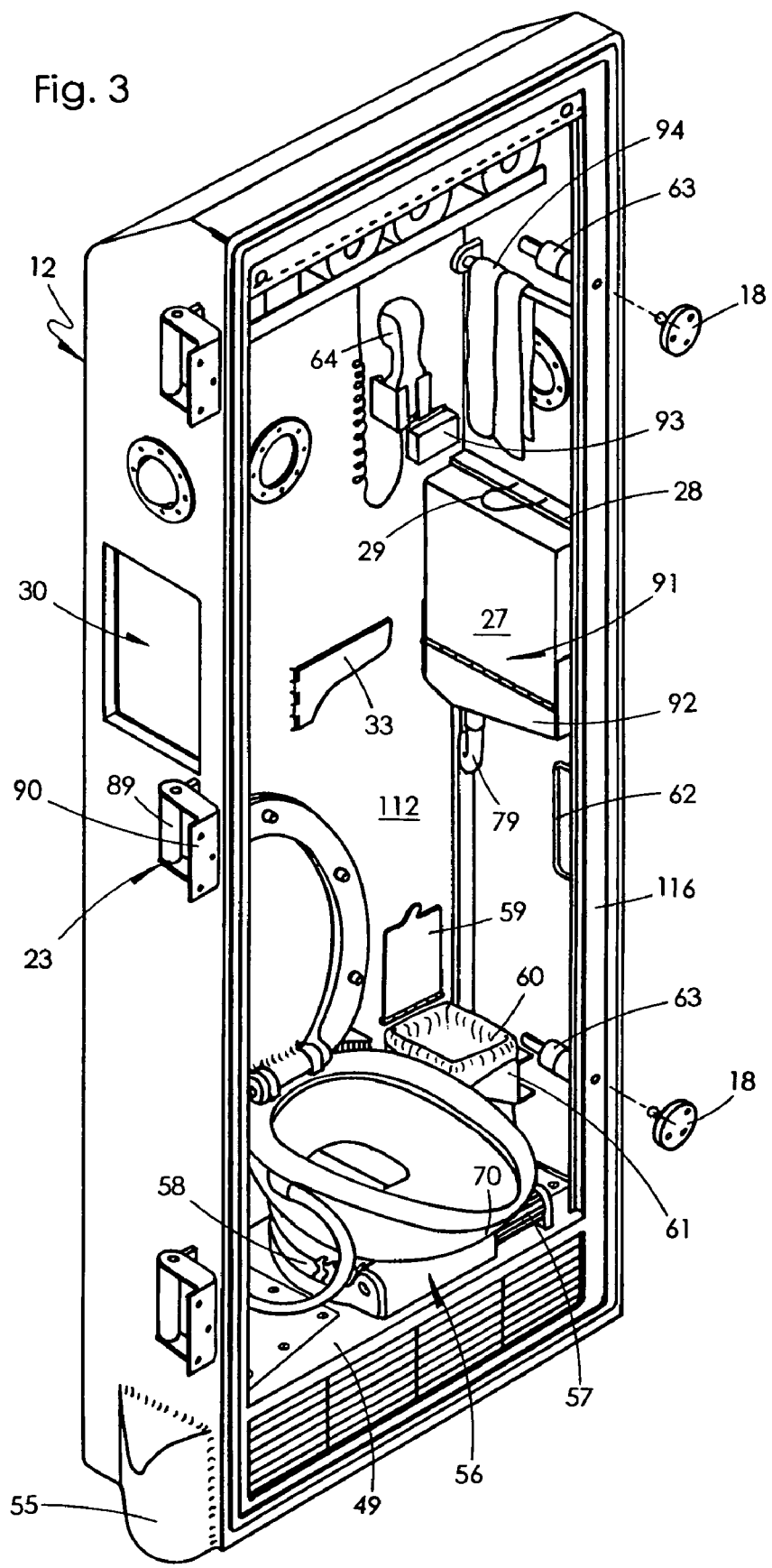
FIG. 3 illustrates a front perspective view of the preferred embodiment's case.
Figure 4:
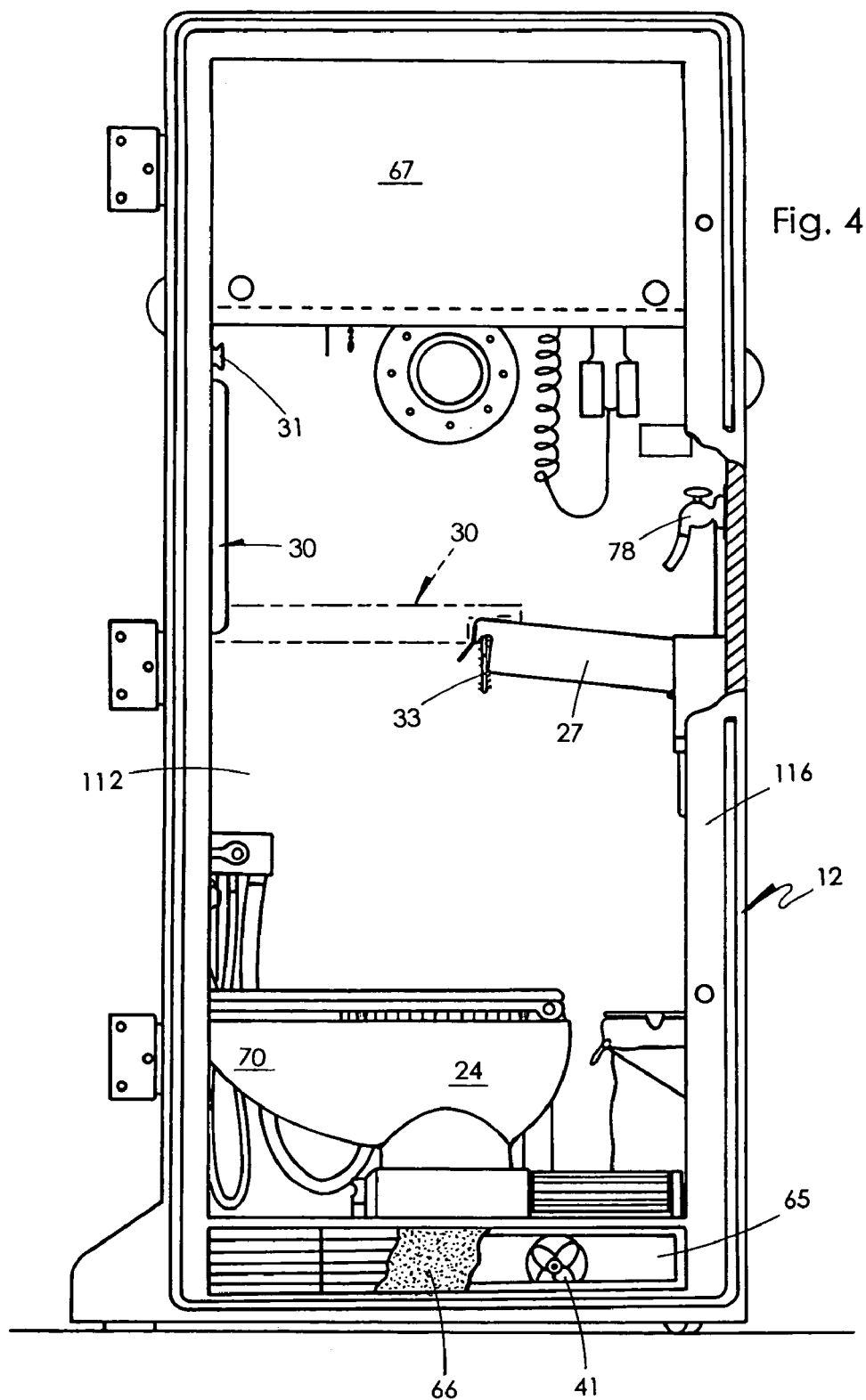
FIG. 4 illustrates a front elevation view of the preferred embodiment's case with various broken out section views, the dash-dot-dot-dash lines shown objects in an alternative position.

A sink unit 91 fixed on the concave section's wall has a folding hinged sink recipient 27 mounted on a stationary hinged recipient 92 and includes a drain pipe 79 (FIGS. 3 and 4). The folding hinged recipient 27 is set in a vertical position, covering a faucet 78 installed on the same concave section's wall, which is presently illustrated on the right side; the folding recipient 27 includes a handle 29 and a groove 28 to hold the folding recipient 27 over a hinged bracket 33.

A toilet 24 with its seat 25 and cover 26 are secured to a hollow gear 58 which performs as a base for the toilet 24, the base is composed of a worm-gear-drive mechanism 56 attached to the center of the stage 49, a roller 57 connected to a input shaft 46 (FIGS. 2 and 3), a pivoting coupling 47 to join the toilet drain section to a main drain line 19, the pivoting coupling 47 vertically mounted, centered within the drive mechanism 56.

A flexible flush toilet line 45 joins a flush mechanism 44 to the toilet bowl section.

A security service window 30, presently illustrated on the left concave case's wall, is made of an opaque bulletproof material having a manual locking device 31, which faces the concave section 112 and locks on a stationary lock pin 32; a means of visual observation of the cabin 52, composed of various panoramic one-way lenses 42, are installed in the walls close to window 30.

The main drain line 19 pass centered in a slot 50, runs in the same direction as a pin hinges' center lines 82, is housed under the protruding cavity 55 and joined by means of a "Y" coupling 80 to the sink drain pipe 79 and pivoting coupling 47; the drain line includes a pivoting coupling 48 intersecting it in the floor's slot (FIG. 2).

Figure 9:
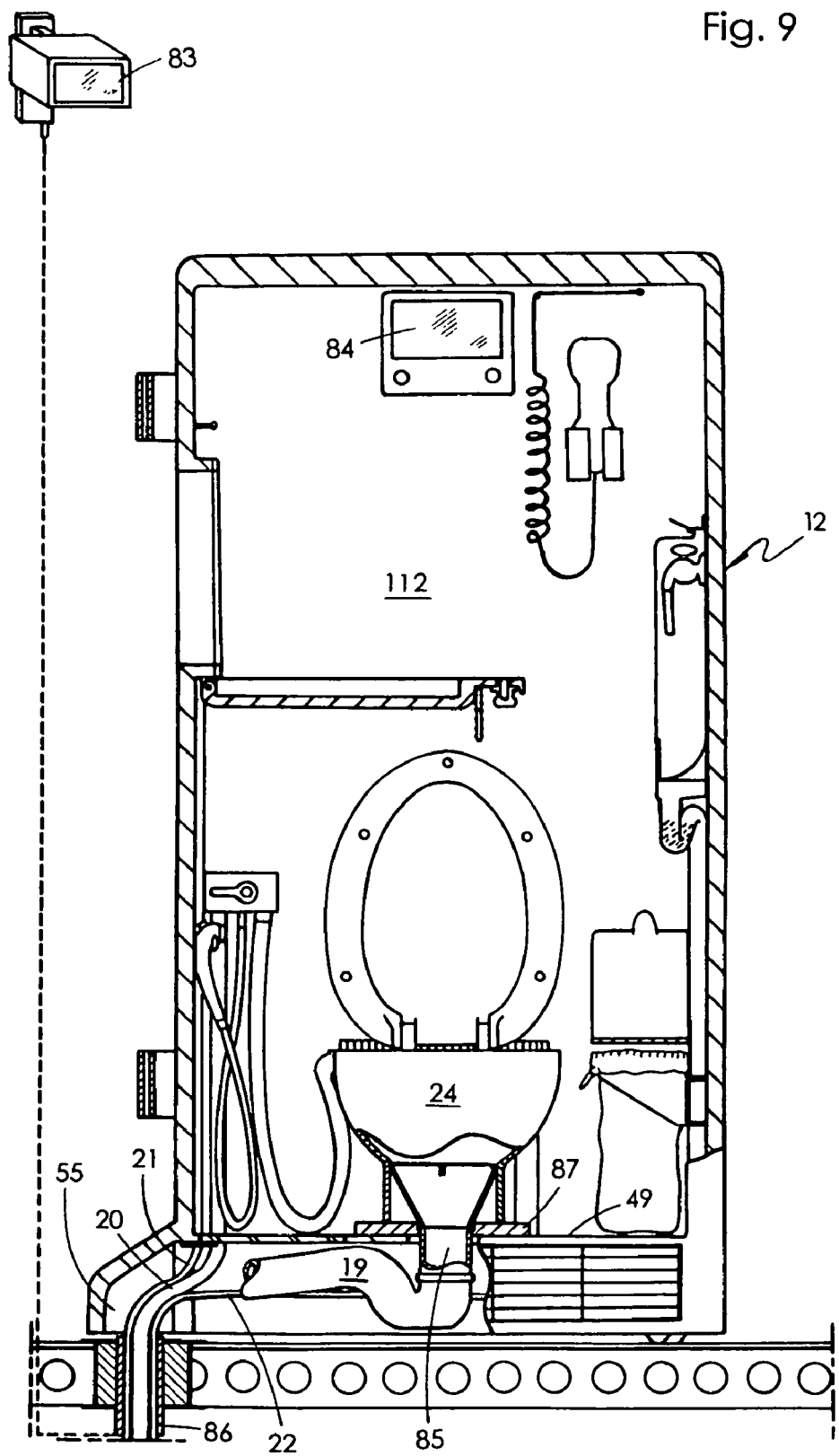
FIG. 9 shows multiple cutting sections, view taken from a front elevation of an alternative embodiment; the communication line is shown in dashed lines.

A multiple-conduit-holder member 86 securing a flexible water line 20, a flexible electric line 21, and a flexible electronic line 22 is fixed inside of the slot 50, close to the pivoting coupling 48, the holder member 86 having been illustrated in FIG. 9, provides the same function for all of the embodiments within this application. The flexible water line 20 (FIG. 2) has been connected to a water distribution and control box 43 set in the concave section 112; the box is accessible by hand and includes the toilet flush mechanism 44 and a handy-hose shower 54. The flexible electronic line 22 feeds an intercom unit composed of a first handset 64 set inside the concave section 112 and a second handset 68 set outside of the case 12, (FIGS. 3 and 5) The electronic line will also feed any electronic equipment set within the concave section 112. The flexible electric line 21 further feeds electric-powered equipment set within the concave section 112.

A restroom performance space 14 (FIGS. 1F and 1R) is created between two vertical panel walls 15 that are presently illustrated in FIG. 1F, as existing in the aircraft, mounted to each side of the doorframe 16 inside of cockpit 53 and are illustrated in dash-dot-dot-dash lines. A door 11 is set by the edges of the panel walls 15, opposite from the doorframe 16 and the case concave section 112. Also, a mirror 76 can be installed on the panel walls 15.

The drawing in FIG. 2 illustrates a switched lamp 77 installed in the concave section 112, a purifier of ambient air 81 that includes an air return conduit 39 mounted behind the toilet bowl 24 in line with its top edge, a duct 40 to bring the air suctioned by a blower 41 to an air exhaust duct 65, which is fully covered by an air filter 66 (FIG. 4).

The concave section also include a retractable cover 67 set horizontally on the upper front section, supplies, articles, and accessories such as: a trashcan 61 having a cover 59 and a disposable plastic liner 60, a toilet paper holder 38, a soap dish 93, a towel bar 94, and a supply shelf 36 holding supplies articles 37.

Operation—FIGS. 1F, 1R, 2, 3, 4 and 6.

Figure 1R:
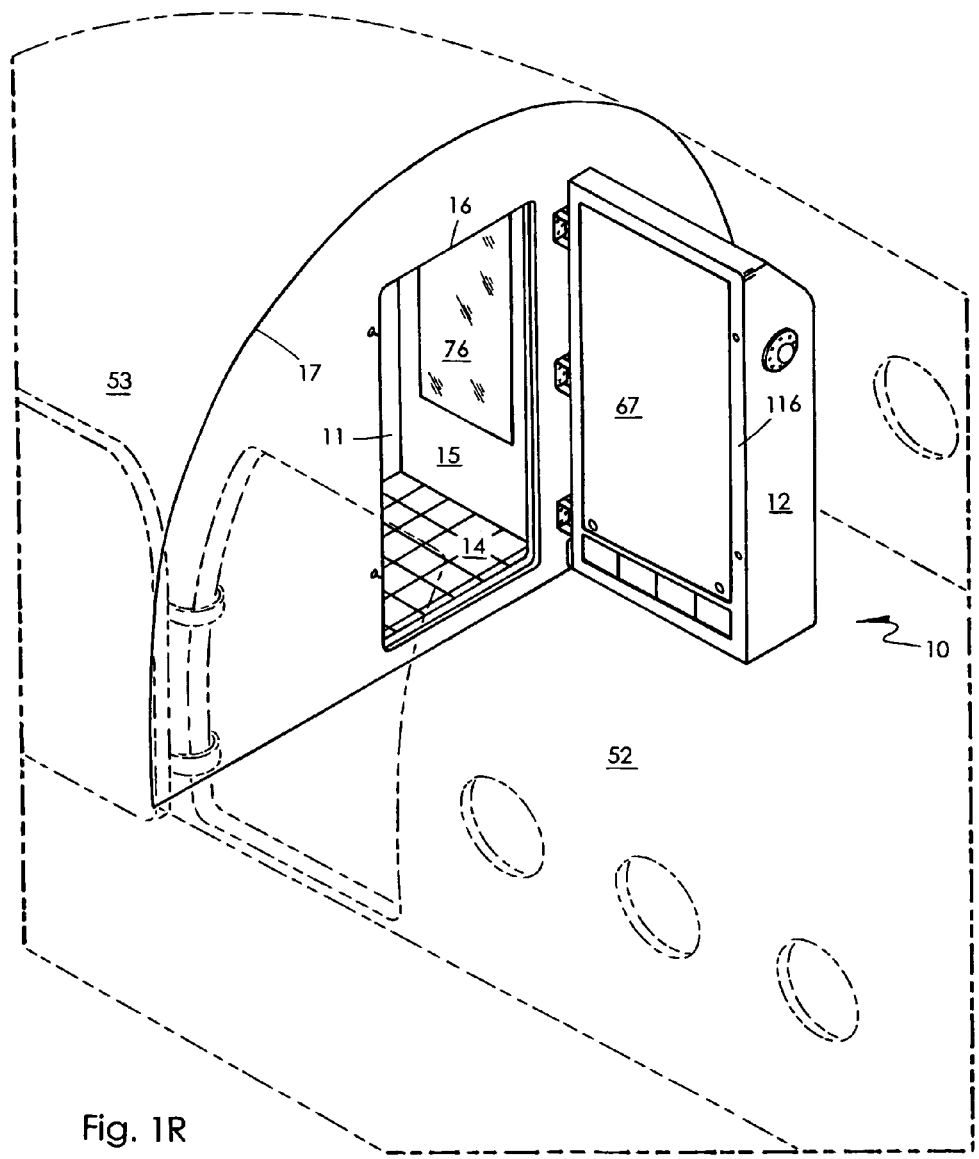
FIG. 1R illustrates a rear perspective view of the preferred embodiment installed in an aircraft. The case body is set in an open position; the wall, doorframe and entry paneling of the cabin are shown in solid lines to indicate that their are part of the invention; cabin's facilities and equipment are not shown.

I prefer to disclose the operation of the preferred embodiment 10 starting from an open position of the case 12 as illustrated in FIG. 1R. The first step is to raise the case's retractable cover 67 (FIG. 4) and close the case 12 by the handle 62 (FIG. 3), the case 12 will move on the rolling mechanism 51 until its flat edge 116 rests against the doorframe 16, (FIG. 1F). Then, the crewmember should engage the lock member's case 63 to secure the case 12 against the doorframe 16, blocking the access from cabin 52 to cockpit 53.

To place the toilet 24 in a position for utilization, the first step is to rotate the roll 57 with the right foot 72 until the hollow gear 58 rotates and the front section 70 of the toilet 24 is positioned outside of the doorframe 16, (FIG. 8 which shows an alternative embodiment of the present invention), said roll 57 is connected to the worm-pinion shaft 46 of the worm-gear drive mechanism 56 installed over the stage 49. To utilize the toilet 24, a privacy door 11 should be closed and the ambient air purifier 81, together with the lamp 77 turned on. Then, the cockpit security door/restroom 10 is ready to provide comfort in the restroom performance space 14 to a cockpit crewmember.

The toilet 24 is utilized in the same mode as a regular aircraft toilet; the cover 26 will be raised to permit a crewmember to sit on the toilet seat 25 or the toilet seat 25 can be raised for a male crewmember to utilize the toilet 24 for urination; To flush the toilet 24, use the flush mechanism 44, which connects to the flexible flush line 45 (FIG. 2).

To utilize the sink 91, the crewmember should position the hinged bracket 33 perpendicularly, then pull the sink's folding recipient 27 by the handle 29 to set the groove 28 on the bracket 33 (FIGS. 3 and 4); the faucet 78 can be opened to provide water for the personal hygiene of each crewmember; this function can be completed by the addition of the soap dish 93 and the towel bar 94.

The water that feeds the faucet 78 comes from the water control box 43 connected to the flexible water line 20; the water utilized in the sink 91 will drain through the drain pipe 79, which is joined to the "Y" coupling 80 that also connects the pivoting toilet drain coupling 47 and the main drain line 19. The main drain line 19 will pivot with the case 12 because it is fitted inside the pivoting coupling 48 which, in turn, is fitted in the floor slot 50, the center of the pivoting coupling 48 is in line 82 with the hinge pin that connects the movable 89 and stationery 90 hinge leafs. All the drainpipes are protected from damage by the protruding cavity 55 and the lower cavity section 113 of the case section.

To dispose of garbage, the crewmember uses the trashcan 61, which has the disposable plastic liner 60 and the cover 59, which should be kept closed when not disposing garbage.

To keep a stock of the most common articles 37 utilized for servicing a restroom; the supply shelf 36 is utilized to hold all necessary articles for replacement during a flight.

The secure service window 30 can be opened by the crewmembers to receive, from a flight attendant 35, a tray 34 containing food, drink, or other of services. To open the service window 30, the crewmember should first look through the one-way lenses 42 to the cabin 52, unlock the manual locking device 31, and open the window 30, placing it over the foldable bracket 33; also, the window can rest over the sink recipient 27 to permit crewmember to set the tray 34 over the sink (FIG. 4).

Also, the crewmember can utilize intercom 64 to communicate with the cabin and cabin personnel can communicate with the restroom area, utilizing intercom 68 (FIG. 5 which shown an additional embodiment).

FIG. 6 illustrates a crewmember 71, by solid lines, seated on the toilet seat 25. Note that the position of the toilet's front section 70 forces the crewmember 71 seated on the toilet to position the feet 72 outside of the door frame 16, however, still inside of the restroom performance space 14. Thus, when the crewmember stands up (illustrated in dash-dot-dash lines), the head trajectory 74 (illustrated In a heavy line) remains outside the rigid parts, preventing the crewmember's head 73 from contacting any of said parts. Also illustrated is the air path 75 in dashed lines when air is suctioned by the blower 41 through the filter 66 (FIG. 4), duct 40, and distributed by the air exhaust duct 65 to recirculate to the ambient air.

Additional Embodiment

FIG. 5 shows an additional embodiment of the present invention 10 in which an electronic camera 83 and a electronic image display 84 have been added as additional means of observing the case convex section 212 and the surrounding area from the restroom performance space 14. The camera 83 and image display 84 can be optional, or can be substituted for the one-way lenses and should be utilized by the crewmembers before opening any lock mechanism, i.e., either the window service 30 or case 12.

FIG. 7 illustrates an alternative embodiment 10 of the present invention in which a shorter version of the case 12 has been used, with some of the parts, such as the toilet paper holder 38 and the supply shelf 36 (compare with FIG. 6), which are inside the case 12 in the preferred embodiment, being instead mounted in the paneling walls 15. The door 11 provides privacy to the crewmember utilizing the restroom facilities. The crewmember's head is also prevented from contacting rigid parts, in the same mode as in FIG. 6.

Figure 8:
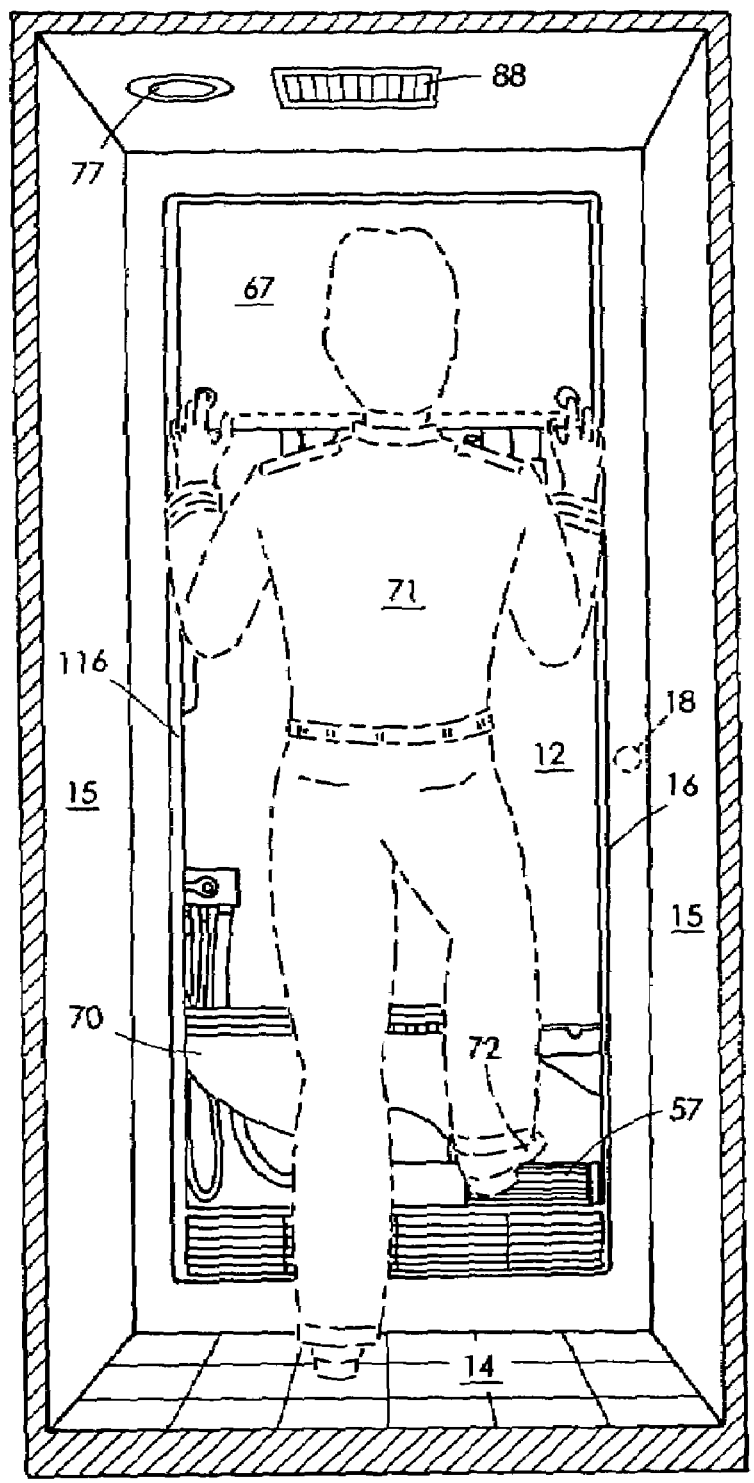
FIG. 8 illustrates a front perspective view of an alternative embodiment; the dash-dot-dash line represents objects that are not parts of the invention.

FIG. 8 shows another alternative embodiment 10 of the present invention in which a single lock member 18 has being provided to interrupt the access to cockpit, a lamp 77 is being switch from the case 12 to set in the restroom performance space 14, and an air conditioning exhaust 88 can substituting the air ambient cleaner device illustrated in the preferred embodiment, or this air exhaust can run together with the air cleaner device.

FIG. 9 illustrates another alternative embodiment 10 of the present invention in which the case 12 is not provided with a one-way lens slot; the camera 83 and image display 84 are utilized for observation of the cabin from the concave section 112; a rigid toilet assembly 24 joins to a toilet drain rigid coupling 85, which is joined to the main drain line 19; the toilet assembly 24 is fixed to a rigid base 87 over the stage 49, the case 12 having been designed as a shorter version. The water 20, electricity 21, and electronic 22 flexible lines to service the case 12 pass trough the same slot as illustrated in the preferred embodiment and are secured to the holder member 86 which provides the same function to all embodiments in this patent application. This alternative embodiment 10 is an economic version of the present invention, which I believe can be used successfully in military, cargo, or other air transport means.

I claim:

1. A device for converting a regular cockpit door with its surrounding traffic space to a cockpit security door/restroom for cockpit crewmembers, said device comprising;

a) a bulletproof wall fixed between said cockpit and a cabin, having a rectangular doorframe set in portrait orientation, including said surrounding traffic space, a plurality of stationary leaf hinges vertically fixed close to the edge of said doorframe, and at least one stationary lock member fixed close to the edge of said doorframe, opposite from said stationary leaf hinge's edge;

b) a rectangular bulletproof case having a flat edge frame, a stage fixed by the low concave section, said concave section facing the cockpit, an opaque convex surface made of a rigid material strong enough to support medium to heavy equipment installed on it, a protruding cavity on the bottom section of the lateral case's wall, a plurality of movable leaf hinges fixed vertically on said lateral case's wall, close to the top surface of said protruding cavity, said movable leaf hinges coupled by means of pins to said stationary leaf hinges, a rolling mechanism installed under said stage opposite from said protruding cavity, said rolling mechanism movable over the floor, a handle fixed on a vertical flat edge inside said concave section opposite from said hinge's edge, at least one rigid lock mechanism in said flat edge, mounted opposite from hinge's flat edge and a stationary lock member fixed on said door, both said stationary and movable lock members designed to fit and lock in position when said case's flat edge surface is in full contact on the contour of said doorframe; A sink unit fixed on a case's wall of said concave section, having a pivoting sink recipient mounted on a stationary recipient on said case's wall; said stationary mounted recipient including a drain pipe; said pivoting sink recipient, in its vertical position, covering a faucet installed on said case's wall, on which said stationary recipient is installed; said pivoting sink unit when set in a horizontal position, enabling a cockpit crewmember to utilize said faucet and said drain pipe enabling the draining of all water coming from said faucet, as well as a toilet secured to a base, said base comprised of a worm-gear drive mechanism centrally attached to said stage, a roller connected to the input shaft of said drive mechanism, rotated by a crewmember's foot, a toilet coupling mounted within of the gear of said drive mechanism, able to pivot vertically, joining the toilet drain line section to a main drain line, a flush toilet line joining a flush mechanism to the toilet flush section, said flush line flexibly mounted, said toilet able to rotate to be inside of said case cavity's front section or said toilet front section alternatively positioned outside of said flat edge frame, a security service window, fixed on a case's wall opposite from said faucet unit, made of a bulletproof material, providing service from said cabin to said cockpit; said window including an opaque surface, a manual locking device accessible only from said concave section, and at least one means of visual observation from said cockpit to the area surrounding the aft side case;

c) said main drain line, positioned in a slot on the floor of said cabin, running in the same direction of the pin hinges' center lines and housed under said protruding cavity, joining to said toilet's coupling and said sink drain pipe, said main drain line including a pivoting coupling fixed at the center inside said slot, intersecting said main drain line, enabling it to pivot at the same time at an angle allowing said case to pivot;

d) a multiple-conduit-holder member, fixed inside said slot, close to said pivoting coupling, securing water, electrical, and electronic flexible lines, said flexible water line connected to a water distribution and control box installed in said concave section, said box accessible by hand including said toilet flush mechanism and a handy-hose shower, said flexible electronic line powering an intercom unit, which include two handsets, both said handsets providing communication from or to concave and convex sections of said case, said flexible electrical line further powering all electric-powered equipment set within said concave section;

e) a restroom performance space created between two vertical panel walls, perpendicularly mounted to each side of said frame door inside of the cockpit, a door set by the edges of said panel walls opposite from said doorframe and said case concave section;

f) a light fixture installed in said restroom space, a switch to operate said light fixture, and a means to purify and recycle the ambient air in said restroom space;

g) accessories and supplies that includes a trash can, toilet paper holder, soap holder, towel holder, supply stand; also, a mirror has been set in said restroom space, thereby said device practically does not sacrifice needed space in order to effect the required security and cockpit comfort, permitting the cockpit crewmembers to see the cabin before receiving any service through said window, satisfy any physiological needs hygienically, remain in the cockpit to protect themselves and the equipment against damages from projectiles, avoid any intrusion from hijackers during a route, and exit from cockpit as permits a regular cockpit door.

2. The device set forth in claim 1 wherein said base rigid connected to said toilet and said stage, said toilet's coupling within said base rigidly joining said toilet drain section to said main drain line, said flush toilet line rigid mounted joining said flush mechanism to said toilet flush section for enabling to keep all of the time said toilet front section set outside of said flat edge case.

3. The device set forth in claim 1 wherein said concave section includes a retractable cover, horizontally mounted on the top front section, manually movable from said upper to said lower front section to enable, in a fully lowered position, covering all the parts set behind said flat edge case.

4. The device set forth in claim 1 wherein said wall and said panel walls exist in the transportation means.

5. The device set forth in claim 4 wherein said transportation means is an aircraft.

6. The device set forth in claim 1 wherein said means of visual observation is composed of various bulletproof slots, which contain various one-way lenses fixed in the bulletproof case.

7. The device set forth in claim 1 wherein said means of visual observation is a electronic camera, positioned outside of the case, taking and sending the images of the surrounding aft side case to a display installed inside of said case cavity.

8. The device set forth in claim 1 wherein said electronic line provides power to operate said camera, display, and intercom unit.

* * * * *

UNITED STATES PATENT AND TRADEMARK OFFICE
CERTIFICATE OF CORRECTION

| | | |
|---|---|---|
| PATENT NO. | : 7,014,148 B2 | Page 1 of 1 |
| APPLICATION NO. | : 10/969612 | |
| DATED | : March 21, 2006 | |
| INVENTOR(S) | : Armando Dominguez | |

It is certified that error appears in the above-identified patent and that said Letters Patent is hereby corrected as shown below:

On the title page (75) delete the address and insert therefor --11335 S.W. $32^{nd}$ Street, Miami, Fl. 33165--.

On the title page (73) delete the assignee.

Signed and Sealed this

Seventeenth Day of October, 2006

JON W. DUDAS
*Director of the United States Patent and Trademark Office*